United States Patent
Weinger

(10) Patent No.: US 6,424,699 B1
(45) Date of Patent: Jul. 23, 2002

(54) MEDICAL X-RAY DIGITIZING AND CHART STORAGE SYSTEM

(76) Inventor: Elliott B. Weinger, 1113 Harrison St., Hollywood, FL (US) 33019

(*) Notice: Subject to any disclaimer, the term of this patent is extended or adjusted under 35 U.S.C. 154(b) by 0 days.

(21) Appl. No.: 09/137,491

(22) Filed: Aug. 21, 1998

(51) Int. Cl.[7] .................................................. H05G 1/28
(52) U.S. Cl. ........................ 378/165; 378/166; 378/98.2
(58) Field of Search ............................... 378/165, 98.2, 378/166; 600/300

(56) References Cited

U.S. PATENT DOCUMENTS

| | | | |
|---|---|---|---|
| 5,270,530 A | * 12/1993 | Godlewski | |
| 5,871,446 A | * 2/1999 | Wilk | |
| 6,004,276 A | * 12/1999 | Wright et al. | |
| 6,022,315 A | * 2/2000 | Iliff | 600/300 |
| 6,071,236 A | * 6/2000 | Iliff | 600/300 |
| 6,113,540 A | * 9/2000 | Iliff | 600/300 |
| 6,206,829 B1 | * 3/2001 | Iliff | 600/300 |

* cited by examiner

Primary Examiner—David V. Bruce
Assistant Examiner—Pamela R. Hobden
(74) Attorney, Agent, or Firm—Malin, Haley & DiMaggio, P.A.

(57) ABSTRACT

A system and method for transferring x-ray roentgenograms to a digital format for patient hospital or office records is provided. A high resolution digitizer interfaced with computer technology is used to scan each x-ray as it is delivered from the x-ray processor, to encode the x-ray with selected information such as the patient's name and medical record number, and to immediately print a hard paper copy to be included with the patient record. The hard paper copy can be a high resolution plain paper print out. The system can simultaneously store a digital representation of the x-ray picture in a computer readable format for easy access, and/or transmission to another site, at any time. Thousands of x-ray prints can be stored indefinitely on discs, saving vast amounts of storage space.

13 Claims, 2 Drawing Sheets

MEDICAL X-RAY DIGITIZING AND CHART STORAGE SYSTEM

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates to electronic processing of X-ray roentgenograms, and more particularly to an electronic process that includes the transference of X-ray roentgenograms to a high resolution digital form that can incorporate patient information, including name and medical record number, and/or bar-coding, that can be printed for inclusion with the patient's office or hospital chart, that can be digitally enhanced to improve diagnoses, and/or that can be stored in a medical computer system for ready retrieval.

2. Description of Related Art

In the medical field, patient hospital or office charts presently include only typed or printed reports. X-rays films taken of the patient for diagnostic or other purposes are kept separate from the patient's medical chart. Even in the most efficient hospitals, X-ray films are often misplaced or even lost. In large patient volume emergency room operations, X-ray films may "disappear" and are occasionally never found.

Orthopedic Surgeons typically read their own X-ray films. It would be an invaluable aid to their practice to actually see an x-ray picture rather than a verbal or written interpretation that is often delayed by as much as 24 to 36 hours before appearing on a hospital record.

In providing off hours emergency room (E.R.) coverage, Orthopedic surgeons and other specialists are typically at the mercy of in-experienced resident, or E.R. Physicians, and must often make a decision for emergency care based upon interpretations of x-rays which are frequently inaccurate.

The above problems are also encountered in many other areas of medicine including internal medicine, surgical specialties, and radiology.

BRIEF SUMMARY OF THE INVENTION

The present invention provides a system for transferring x-ray roentgenograms to a digital format for patient hospital or office records. A high resolution digitizer such as a digital scanner interfaced with computer technology is used to scan each x-ray as it is delivered from the x-ray processor, to encode the x-ray with selected information such as the patient's name and medical record number, and to immediately print a hard paper copy to be included with the patient record. The hard paper copy can be a high resolution plain paper print out. The system can simultaneously store a digital representation of the x-ray picture in a computer readable format for easy access, and/or transmission to another site, at any time. Thousands of x-ray prints can be stored indefinitely on discs, saving vast amounts of storage space.

The applications of the present invention include hospitals and most large physician offices and multi-specialty clinics throughout the United States, and potentially the world. The ability to view an x-ray picture directly as part of the hospital record by utilizing the present invention is a tremendous asset to patient care.

Utilizing the present invention for Orthopedic surgery, x-ray prints could be faxed or electronic mailed (e-mailed) via computer and modem to the physician's home or office to allow the specialist to make a far more accurate interpretation and correct decision for treatment.

In general and pulmonary medicine, chest x-rays and abdominal films would benefit from the present invention and could include the addition of "colorization techniques" to colorize a pulmonary infiltrate or lesion and monitor its progression with treatment.

Radiologists utilizing the present invention will be able to give virtually immediate preliminary x-ray reports on all x-rays which typically might not otherwise be read for many hours, possibly delaying critical patient care. Utilizing the present invention, the x-ray image can be faxed or e-mailed directly to the radiologist's home. The radiologist can write a preliminary interpretation and fax or e-mail the report back to the hospital or other source, dramatically enhancing the efficiency of health care to the patient.

Accordingly, it is an abject of the present invention to provide a system for transferring x-ray roentgenograms to a high resolution print for inclusion with a patient hospital or office record.

It is another object of the present invention to provide a system for transferring x-ray roentgenograms to computer readable format for storage and/or transmission.

In accordance with these and other objects which will become apparent hereinafter, the instant invention will now be described with particular reference to the accompanying drawings.

DETAILED DESCRIPTION OF THE INVENTION

Figure 1:
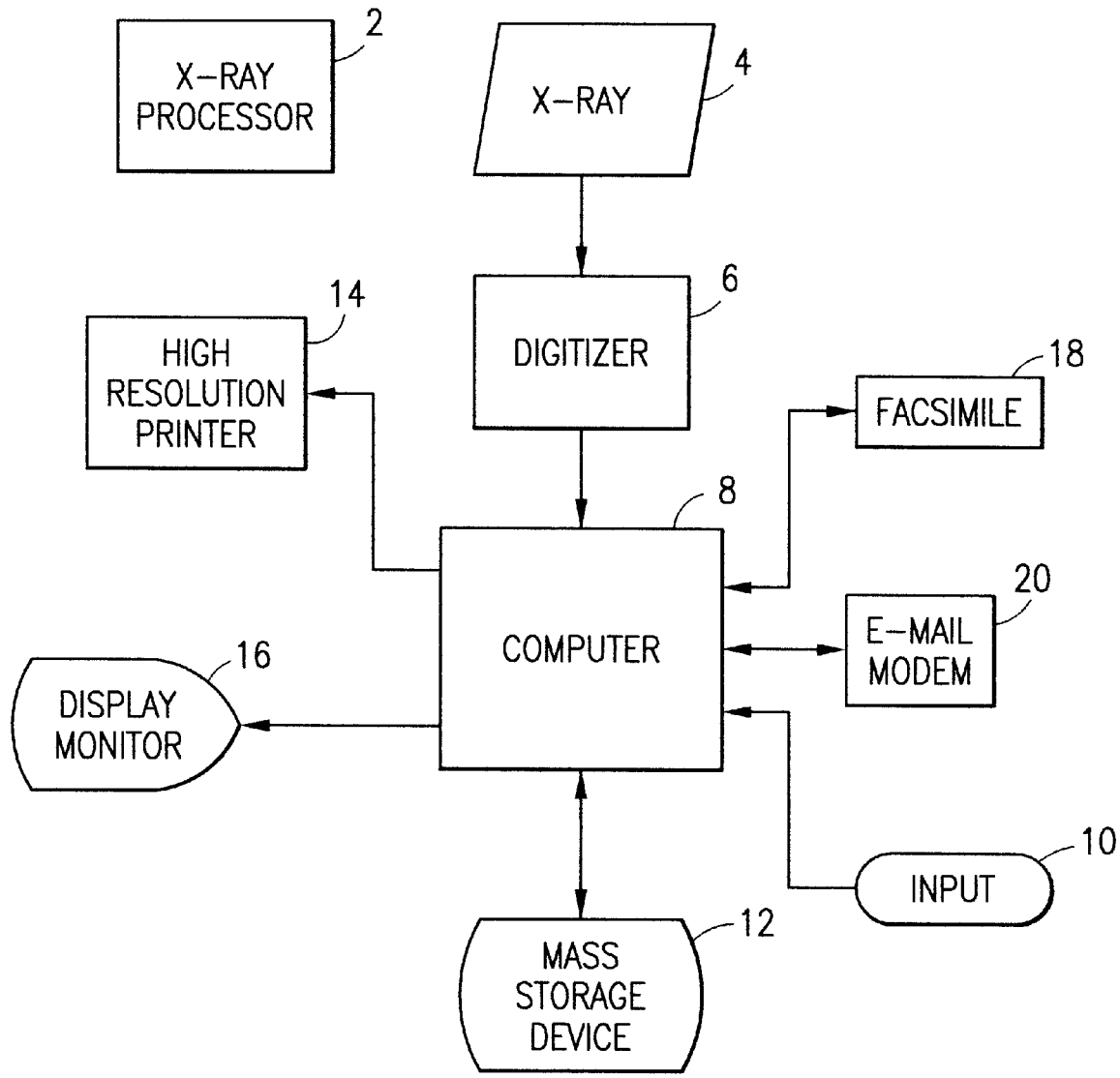
FIG. 1 is a diagrammatic view of the present invention.

Referring to FIG. 1, a block diagrammatic view of one embodiment of the present invention is illustrated. X-ray processor 2, which can be a conventional x-ray machine, produces x-ray roentgenogram 4. Digitizer 6, which is discussed further hereinbelow, converts x-ray roentgenogram 4 into a computer readable digital format which is read by computer 8. Once the digitized image of x-ray 4 is read by computer 8, the digitized image can be combined with patient data entered via keyboard 10, or via mass storage device 12. The patient data entered can be the patient identification information including name and medical record number. The mass storage device 12 can be one or more conventional disc drives (hard drives, floppy drives, and/or compact discs (CDs)) or other magnetic or other non-volatile storage media as known in the art.

Once the patient data is combined with the digital image of the x-ray, which takes place very quickly, the x-ray and patient identification data can be printed by a high resolution printer 14, and/or displayed by a suitable high resolution monitor 16. The patient identification data will be formatted to be printed with the x-ray image in a preselected location so as not to interfere with interpretation of the x-ray image. A printed x-ray image can then be attached to, and remain with, the patient medical chart.

The x-ray image and patient data can be sent via facsimile 18 and/or e-mail 20 to remote sites. Transmitting the x-ray image in this manner, allows physicians in sites remote from the x-ray machine 2 and actual x-ray roentgenogram 4, to view a high quality x-ray image and improve the ability to made a quick and accurate diagnosis. The e-mail modem 20 further provides the ability to transmit the x-ray image over the Internet so that specialists located anywhere in the world with Internet access can receive a high quality x-ray image. Of course, the quality of the x-ray image displayed and/or printed will be partially dependent upon the quality of the hardware at the remote site.

In addition to the x-ray image and patient identification information, the entire patient medical record can be retrieved from storage device 12, and transmitted along with the x-ray image. The physicians located at remote sites can interpret the x-ray image along with the patient medical record, and prepare preliminary reports. The preliminary reports can be faxed 18 or e-mailed 20, back to the site of origin of the x-ray 4. The e-mail modem connection 20 provides the capability of sending preliminary reports over the Internet.

The x-ray image, with affixed patient data, along with the full patient record stored within storage device 12, can be quickly retrieved and printed 14, displayed 16, and/or transmitted by facsimile 18 or e-mail 20 at any time. In addition, the patient medical chart will have a high resolution printed x-ray image that will remain with the chart at all times. The actual x-ray roentgenogram 4 can be stored, but it will no longer be necessary to locate the actual x-ray 4 roentgenogram to view the x-ray image.

X-ray image quality is a function of spatial resolution and definition. Spatial resolution is an objective measure of the ability of a system to resolve high-contrast line pairs on the final x-ray image. Definition is a subjective evaluation of an image based on its overall general appearance which may include factors such as edge sharpness, contrast range, brightness, clarity, and other screen qualities that influence the way an image appears.

Resolution of film and digital images are measured in different ways, and definition is often more important than spatial resolution for interpretation of x-ray images. However, the x-ray film and the digital image produced therefrom must resolve fine detail to be useful in many medical applications.

With x-ray film, spacial resolution can be measured by the number of high contrast line pairs per millimeter that can be seen on the film. Film x-ray images are capable of resolving 10 line pairs per millimeter of high contrast metal wires, which is high spacial resolution.

Digital resolution can be measured by the number of samples per millimeter. With resolutions the range of 0.50 to 10 samples per millimeter being desirable. Although film x-rays typically have higher spatial resolution in absolute terms, digital images can provide benefits because of the ability to manipulate the digital data. Digital enhancement of particular regions of a displayed image are possible, as well as the ability to shift contrast ranges.

To digitize 6 the x-ray roentgenogram 4, a high resolution digital scanner can be utilized. The output of the scanner is a digital computer readable format of the x-ray image. There are presently x-ray quality digital scanners available, such as those available through Cannon or Adara Technology, for example. These systems typically have an 8 bit to 12 bit dynamic range.

In an alternate embodiment, a digital camera can be utilized to convert the x-ray image 4 to a digital representation of the image. Essentially, a conventional digital camera takes a still picture of the x-ray, but does not require development of film. The output of the digital camera, instead of a photograph of the x-ray image, is a computer readable, digital representation of the x-ray image.

An example of yet another digitization technique is disclosed in U.S. Pat. No. 4,723,26 to Haneda et al. (Haneda), the entire disclosure of which is incorporated herein by reference. The Haneda teaches use of a TV camera and A/D converter for digitization of x-ray images, and the storage in digital form of a single frame.

Figure 2:
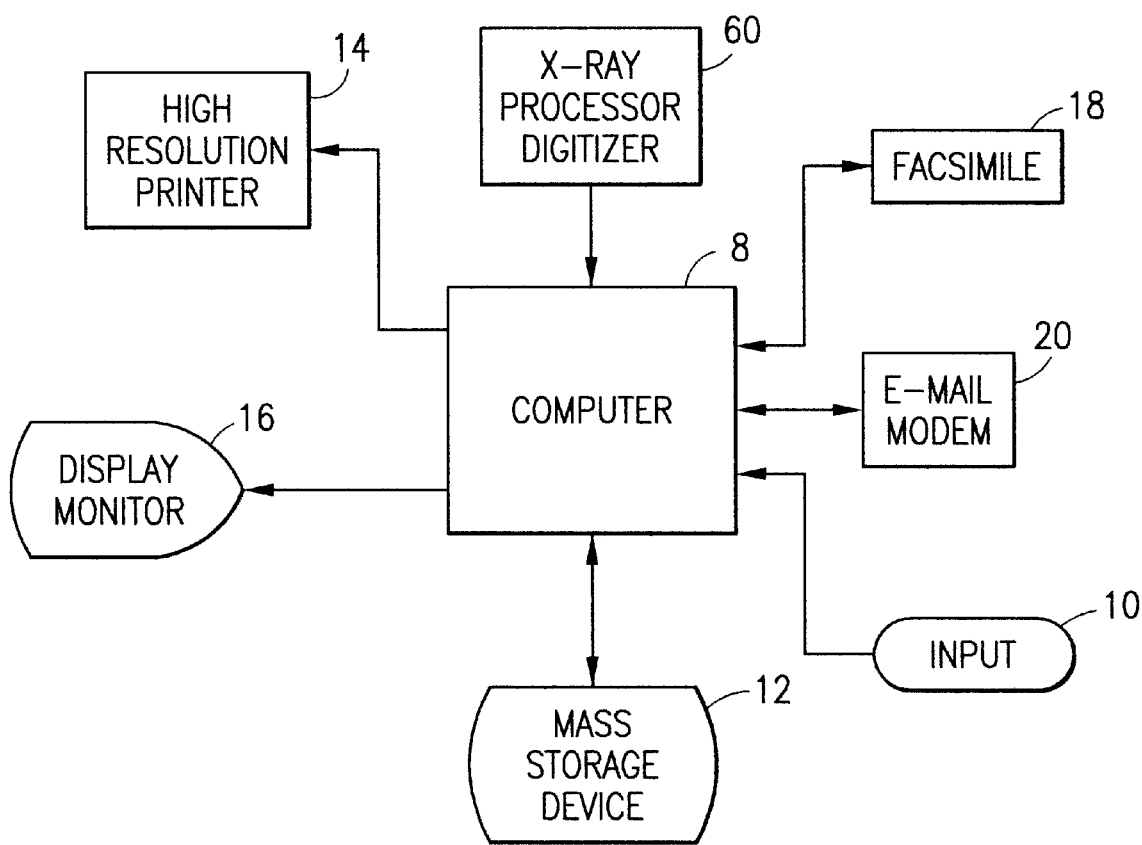
FIG. 2 is a diagrammatic view of an alternate embodiment of the present invention.

Referring to FIG. 2, still another embodiment of the present invention is illustrated. The x-ray processor 2 and digitizer 6 are combined into a single x-ray machine 60 that has as an output, a digital image of the x-ray 4.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for conversion of an x-ray roentgenogram to a digital computer readable image that is combined with preselected patient information and printed for storage in a patient medical record, comprising:

providing an x-ray roentgenogram;

digitalizing said x-ray roentgenogram to form a high resolution digital x-ray image thereof;

combining said digital x-ray image with a preselected patient identification data and formatting said combination for printing so that said preselected patient identification data will not obscure said digital x-ray image when printed;

printing a high resolution image of said combination of said digital x-ray image and said preselected patient identification data on a hard paper copy for insertion into said patient medical record.

2. The method of claim 1, further including:

displaying said combination of said digital x-ray image and said preselected patient identification data on a monitor.

3. The method of claim 1, further including:

storing said combination of said digital x-ray image and said preselected patient identification data in a non-volatile storage medium.

4. The method of claim 1, further including:

transmitting said combination of said digital x-ray image and said preselected patient identification data by facsimile.

5. The method of claim 1, further including:

transmitting said combination of said digital x-ray image and said preselected patient identification data by modem.

6. A system for conversion of an x-ray roentgenogram to a digital computer readable image that is combined with preselected patient information and printed to provide a hard paper copy for a patient medical record, comprising:

means for providing an x-ray roentgenogram;

means for digitizing said x-ray roentgenogram to form a high resolution digital x-ray image thereof;

means for combining said digital x-ray image with a preselected patient identification data and formatting said combination for printing so that said preselected patient identification data will not obscure said digital x-ray image when printed; and means for printing a high resolution image of said combination of said digital x-ray image and said preselected patient identification data on a hard paper copy for inclusion in said patient medical record.

7. The system of claim 6, further including:

means for displaying said combination of said digital x-ray image and said preselected patient identification data on a monitor.

8. The system of claim 6, further including:

means for storing said combination of said digital x-ray image and said preselected patient identification data in a non-volatile storage medium.

9. The system of claim 6, further including:

means for transmitting said combination of said digital x-ray image and said preselected patient identification data.

10. A system for conversion of an x-ray roentgenogram to a digital computer readable image that is combined with preselected patient information and printed to provide a hard paper copy to said patient medical record, comprising:

means for providing an x-ray roentgenogram;

means for digitizing said x-ray roentgenogram to a form a high resolution digital x-ray image thereof;

means for combining said digital x-ray image with a preselected patient identification data and formatting said combination for printing so that said preselected patient identification data will not obscure said digital x-ray image when printed;

means for transmitting said combination of said digital x-ray image and said preselected patient identification data; and means for printing a hard paper, high resolution copy of said x-ray image and said patient identification data for inclusion in said patient medical record.

11. The system of claim 10, further including:

means for displaying said combination of said digital x-ray image and said preselected patient identification data on a monitor.

12. The system of claim 10, further including:

means for storing said combination of said digital x-ray image and said preselected patient identification data in a non-volatile storage medium.

13. The system of claim 10, further including:

means for printing a high resolution image of said combination of said digital x-ray image and said preselected patient identification data.

* * * * *

(12) EX PARTE REEXAMINATION CERTIFICATE (6776th)
United States Patent
Weinger

(10) Number: US 6,424,699 C1
(45) Certificate Issued: Apr. 21, 2009

(54) MEDICAL X-RAY DIGITIZING AND CHART STORAGE SYSTEM

(76) Inventor: Elliott B. Weinger, 1113 Harrison St., Hollywood, FL (US) 33019

Reexamination Request:
No. 90/007,791, Oct. 31, 2005

Reexamination Certificate for:
Patent No.: 6,424,699
Issued: Jul. 23, 2002
Appl. No.: 09/137,491
Filed: Aug. 21, 1998

(51) Int. Cl.
*H04N 1/00* (2006.01)
*H04N 1/32* (2006.01)

(52) U.S. Cl. .................. 378/165; 378/166; 378/98.2
(58) Field of Classification Search ................. None
See application file for complete search history.

(56) References Cited

U.S. PATENT DOCUMENTS

| | | | |
|---|---|---|---|
| 4,764,870 A | 8/1988 | Haskin | |
| 4,817,050 A | 3/1989 | Komatsu et al. | |
| 4,910,609 A | 3/1990 | Nicholas et al. | |
| 5,168,548 A * | 12/1992 | Kaufman et al. | 704/200 |
| 5,179,651 A | 1/1993 | Taaffe et al. | |
| 5,241,472 A * | 8/1993 | Gur et al. | 382/128 |
| 5,272,625 A | 12/1993 | Nishihara et al. | |
| 5,291,401 A | 3/1994 | Robinson | |
| 5,321,520 A | 6/1994 | Inga et al. | |
| 5,384,643 A | 1/1995 | Inga et al. | |
| 5,416,602 A | 5/1995 | Inga et al. | |
| 5,437,024 A * | 7/1995 | French | 707/10 |
| 5,469,353 A * | 11/1995 | Pinsky et al. | 382/131 |
| 5,513,101 A * | 4/1996 | Pinsky et al. | 705/3 |
| 5,542,003 A * | 7/1996 | Wofford | 382/132 |
| 5,598,185 A * | 1/1997 | Holmgren | 345/593 |
| 5,619,991 A * | 4/1997 | Sloane | 600/300 |
| 5,655,084 A * | 8/1997 | Pinsky et al. | 705/3 |
| 5,715,823 A | 2/1998 | Wood et al. | |
| 5,734,915 A * | 3/1998 | Roewer | 715/512 |
| 5,740,428 A | 4/1998 | Mortimore et al. | |
| 5,802,518 A | 9/1998 | Karaev et al. | |
| 5,810,747 A | 9/1998 | Brudny et al. | |
| 5,815,156 A | 9/1998 | Takeuchi | |
| 5,836,877 A | 11/1998 | Zavislan | |
| 5,851,186 A | 12/1998 | Wood et al. | |
| 5,857,967 A | 1/1999 | Frid et al. | |
| 5,949,491 A | 9/1999 | Callahan et al. | |
| 6,006,191 A | 12/1999 | DiRienzo | |
| 6,032,120 A | 2/2000 | Rock et al. | |
| 6,064,490 A | 5/2000 | Minamizawa | |
| 6,101,536 A | 8/2000 | Kotani et al. | |
| 6,157,675 A | 12/2000 | Mitsuhashi et al. | |
| 6,381,029 B1 | 4/2002 | Tipirneni | |
| 2001/0011301 A1 | 8/2001 | Sato et al. | |
| 2001/0032246 A1 | 10/2001 | Fardella et al. | |

FOREIGN PATENT DOCUMENTS

| | | |
|---|---|---|
| EP | 0844581 | 5/1998 |
| EP | 0844781 | 5/1998 |
| JP | 2000224542 | 8/2000 |
| JP | 2001252284 | 9/2001 |
| WO | WO 99/64971 | 12/1999 |

OTHER PUBLICATIONS

Morin et al. "The Electronic Radiology Practice at Mayo Clinic Jacksonville", IMAC'95, Aug. 1995.*

(Continued)

*Primary Examiner*—Linh My Nguyen

(57) ABSTRACT

A system and method for transferring x-ray roentgenograms to a digital format for patient hospital or office records is provided. A high resolution digitizer interfaced with computer technology is used to scan each x-ray as it is delivered from the x-ray processor, to encode the x-ray with selected information such as the patient's name and medical record number, and to immediately print a hard paper copy to be included with the patient record. The hard paper copy can be a high resolution plain paper print out. The system can simultaneously store a digital representation of the x-ray picture in a computer readable format for easy access, and/or transmission to another site, at any time. Thousands of x-ray prints can be stored indefinitely on discs, saving vast amounts of storage space.

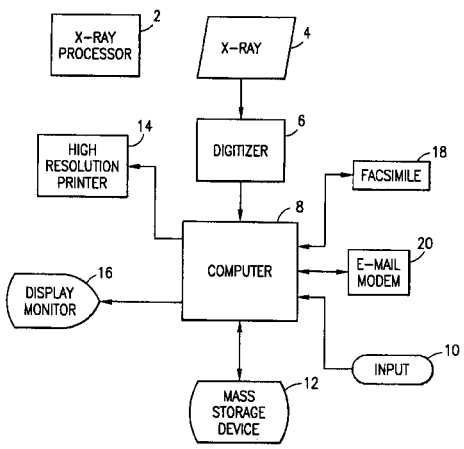

OTHER PUBLICATIONS

Christian et al., *Clinical and Educational Pacs, Teleradiology and Conferencing Using Low–Cost Unix Workstations*, University of Utah Health Sciences Center, 6 pages.

The Official Journal of the Society for Computer Applications in Radiology, vol. 7, No. 1, Feb. 1994, 2 pages.

eMed Technologies advertisement, 2 pages.

Stetnor™ Intelligent Informatics advertisement, 2 pages.

GE ASP Solutions Article, The Healthcare ASP, Apr. 2000, 6 pages.

R. Ernest Waaser, *Demistifying ASP*, Special Projects, Nov./Dec. 2000, 2 pages.

Rick Mancilla, *ASP Infrastructure: Beyond Copper Wire and Fiber Optics*, Special Projects, Nov./Dec. 2000, 4 pages.

Nicole Pliner, *Financially Speaking*, Special Projects, Dec. 2000, 4 pages.

Cooke et al., *Q & A: Issues in ASP*, Special Projects, Nov. 2000, 5 pages.

Osman Ratif MD, Phd, *Outsourcing the Electronic Medical Record;* Nov. 2000, 4 pages.

Keith J. Dreyer DO, *PACS on Call*, Features, Dec. 2000, 3 pages.

Carter H. Yates; *Next Generation PACS*, Special Projects, Dec. 2000, 4 pages.

George Wiley; *Warning: Teleradioactive?*, Features, Dec. 2000, 6 pages.

BRIT Systems Advertisement, 1 page.

COMDISCO System Advertisement, 1 page.

Christian et al., *Clinical and Educational Pacs, Teleradiology and Conferencing Using Low–Cost Unix Workstations*, University of Utah Health Sciences Center, 9 pages.

AMICAS Web/Intranet Image Software, Amicas, Inc., Apr. 26, 2000, 5 pages.

Telemedicine Today Magazine, http://telemedtoday.com/, Apr. 26, 2000, 22 pages.

Tims, Teleradiology Image Management Systems, May 12, 2000, 4 pages.

MedVision, Inc.—Industry Leading Telemedicine Provider, VisiTran 5.0 Technical Information, May 12, 2000, 2 pages.

DataView Imaging International, We/Browser Enabled Radiology; May 12, 2000, 2 pages.

Sirius Corporation, Medical Imaging Web Application, Webserver Ssytems, May 12, 2000, 2 pages.

Mediface Co Ltd., View Webserver, May 12, 2000, 1 page.

InPhact® The Radiology Solutions Company, Company Info, May 12, 2000, 2 pages.

Eastman Kodak Company, New Kodak Distributed Medical Imaging Server Software Offers Improved Navigation, More Powerful Image Access, May 12, 2000, 2 pages.

ACR/NEMA Standards Publication No. 300–1998, Digital Imagind and Communications, 1998.

ACR/NEMA Standards Publication No. PS.3.1, Digital Imaging and Communications in Medicine (DICOM), Part 1: Introduction and Overview, 1992.

NEMA Standards Publication No. PS 3.2, Digital Imaging and Communications in Medicine (DICOM), Part 2: Conformance, 1993.

NEMA Standards Publication No. PS 3.3, Digital Imagind and Communications in Medicine (DICOM), Part 3: Information Object Definitions; 1993.

NEMA Standards Publication No. PS3.4, Digital Imaging and Communications in Medicine (DICOM), Part 4: Service Class Specifications, 1993.

NEMA Standards Publication No. PS 3.5, Digital Imagind and Communications in Medicine (DICOM), Part 5: Data Structures and Encoding, 1993.

NEMA Standards Publication No. PS 3.6, Digital Imaging and Communications in Medicine (DICOM), Part 6: Data Dictionary, 1993.

NEMA Standards Publication No. PS 3.7, Digital Imaging and Communications in Medicine (DICOM), Part 7: Message Exchange, 1993.

ACR/NEMA Standards Publication No. PS 3.8, Digital Imaging and Communications in Medicine (DICOM), Part 8: Network Communication support for Message Exchange, 1992.

NEMA Standards Publication No. PS 3.9–1993, Digital Imagind and Communications in Medicine (DICOM), Part 9: Point to Point Communication Support for Message Center, 1993.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–48 are cancelled.

* * * * *